May 26, 1959 A. A. KUZMITZ 2,888,067
MECHANISM FOR CONTROLLING FUEL TO A GAS TURBINE ENGINE
Filed April 11, 1952 3 Sheets-Sheet 3

INVENTOR.
ANDREW A. KUZMITZ
BY
ATTORNEY

United States Patent Office 2,888,067
Patented May 26, 1959

2,888,067
MECHANISM FOR CONTROLLING FUEL TO A GAS TURBINE ENGINE

Andrew A. Kuzmitz, South Bend, Ind., assignor to Bendix Aviation Corporation, South Bend, Ind., a corporation of Delaware Application April 11, 1952, Serial No. 281,936

13 Claims. (Cl. 158—36.4)

This invention concerns novel apparatus used in connection with the control of fuel to a gas turbine engine.

Aircraft engine manufacturers recognize that the success of our military planes can be influenced by the quality and type of fuel control used for controlling the engine power. In fact, military specifications require that the fuel control system permit the pilot to select the desired power by a simple throttle movement, without concentrating on the manner of manipulation or the transient peculiarities associated with engine acceleration. Furthermore, the engine must respond promptly and safely regardless of the environmental conditions encountered by the aircraft.

The control problems associated with the simple centrifugal type compressor engines have been reasonably well defined and satisfactory engine performance can be achieved with several types of controls. The present engine development trend is toward more efficient engines which generally include an axial flow compressor. Engines of this type are rapidly approaching the efficiency goals established but have one shortcoming, namely, that of compressor surge or stall.

Compressor surge can be broadly described as a drastic reduction in the quantity of compressed air delivery which suddenly occurs when the back pressure exceeds some critical value. The existence of a stall area in the transient operating range of an engine usually lengthens the time required to accelerate the engine from idle to maximum speed, and increases the design complexity of the fuel control. A condition of dangerously high burner temperatures will be encountered, if the fuel flow is not reduced the instant stall occurs. As a general rule, the fuel control is expected to incorporate the necessary mechanisms to permit safe accelerations without entering or causing stall.

The problem of contouring the fuel control schedule is in itself difficult, and the situation is made even more complex by the lack of specific information concerning the location, shape, and changes of the stall area. Many of the early controls for complex engines had rather nebulous performance characteristics. However, a thorough study of the various difficulties indicated that the control operation, for the most part, was sound and that it was the basic engine control information that was of questionable accuracy.

There is no doubt that before an ideal engine control can be made a reality, specific and accurate information on the engine characteristics must be made available to the engine control designer. Present designs are predicated almost entirely on classical or computed data, such as parameter plots or compressor maps. Information of this type is usually derived from individual compressor or turbine tests and theory, with little regard for overall engine configuration or efficiency effects. There appears to be a lack of data on the engine transient characteristics which accurately describes the integrated engine assembly. Because of the lack of knowledge on transient conditions during the acceleration period, there exists in the industry a tendency to compromise on engine performance. Therefore, an extremely important object of the invention resides in the provision of a fuel control mechanism capable of preselecting any desired transient fuel flow for any given speed regardless of the complexity of the optimum fuel schedule requirements for the engine.

A very important object of the invention resides in utilizing the mechanism for investigating gas turbine engine compressor stall and other transient characteristics.

Another important object of the invention resides in the provision of a fuel control mechanism for gas turbine engines wherein a first servo amplifier senses instantaneous engine speeds and a second servo amplifier establishes a predetermined fuel flow for each of the instantaneous speeds sensed.

An important object of the invention is to provide an electro-mechanical engine control mechanism for establishing predetermined fuel flows for selected values of an engine parameter and including apparatus capable of independently controlling flow for any selected value.

It is an object of the invention to provide electro-mechanical mechanisms capable of automatically scheduling fuel to an engine during transient conditions.

An object of the invention resides in the provision of an electro-mechanical fuel control mechanism having means for manually establishing any desired fuel schedule at a given instantaneous engine speed.

A yet further object is to provide novel means for obtaining operational comparison between engines of the same design.

A still further object is the utilization of the invention to obtain the ideal and establish the maximum and minimum transient fuel flow requirements for an engine at any condition of ambient air temperature and pressure.

Another object resides in the provision of novel fuel control means for obtaining comparative data of different fuels on the effect in operational characteristics of a gas turbine engine and the change it has on the ideal transiential fuel flow requirements.

The above and other objects and features of the invention will be apparent from the following description of the mechanism taken in connection with the accompanying drawings which form a part of this specification and in which.

Figure 1:
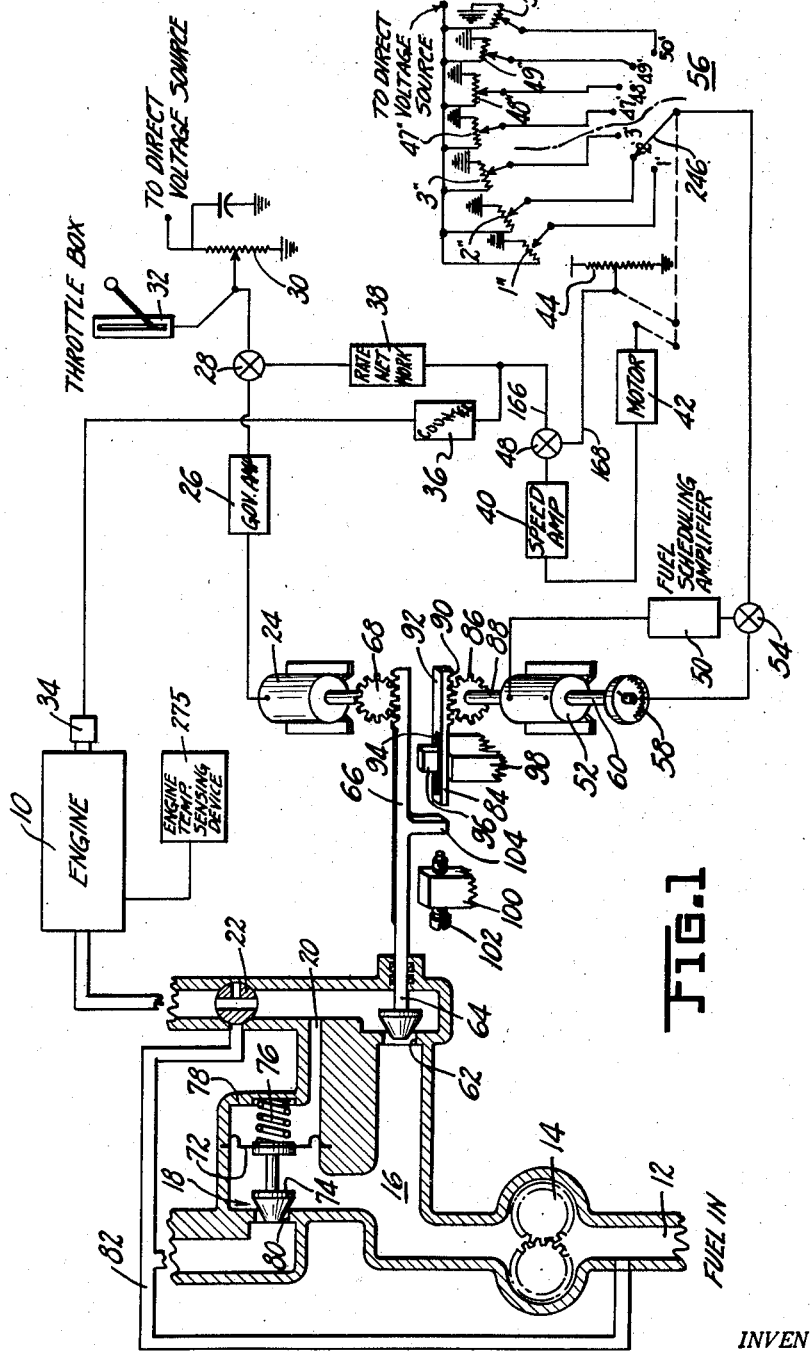
Figure 1 is a diagrammatical representation of the mechanism of the invention shown in association with a gas turbine engine fuel system.
Figure 2:
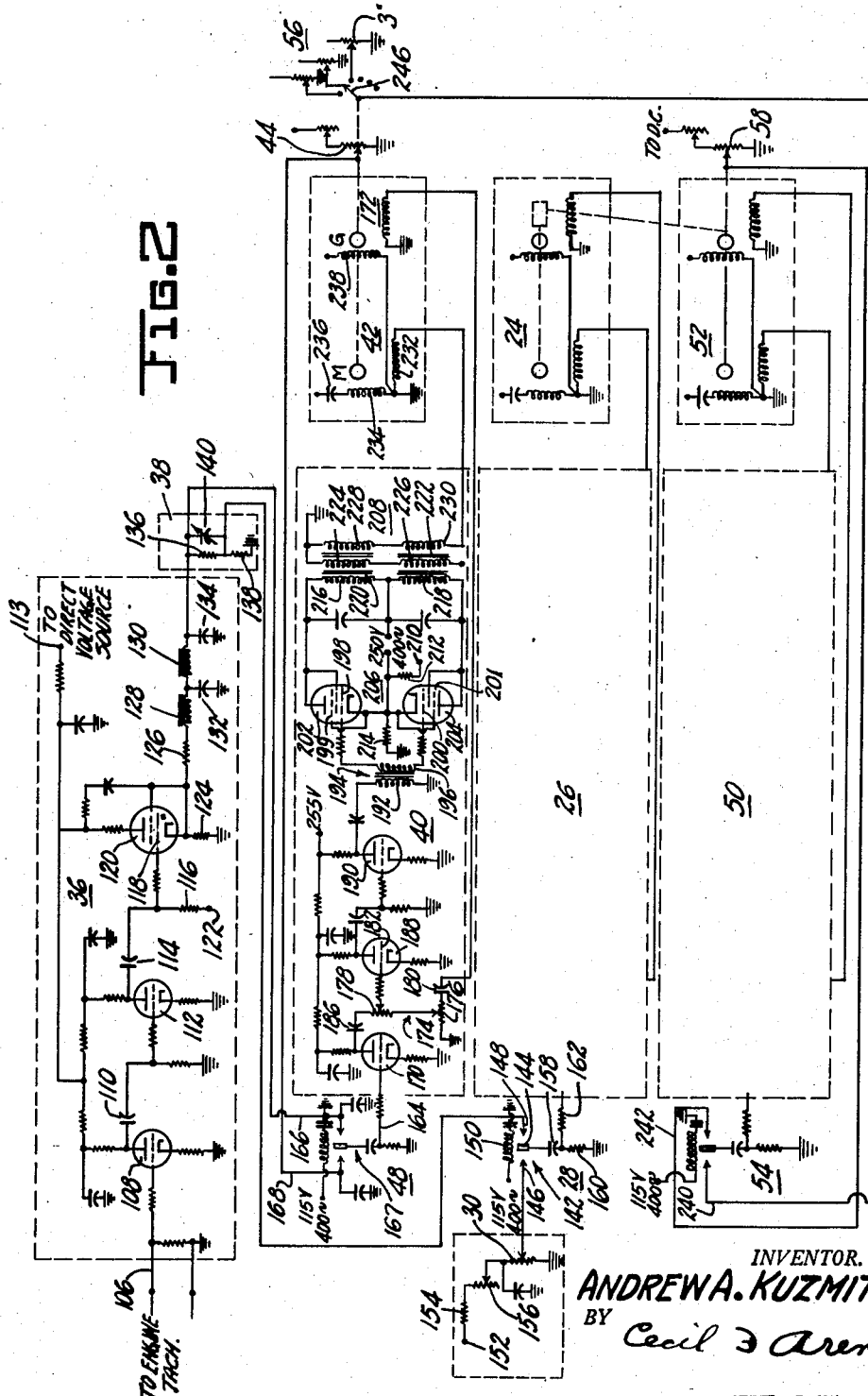
Figure 2 shows the details of the electrical circuitry of the mechanism.

Referring now to Figure 1, the reference numeral 10 designates a gas turbine engine provided with a fuel supply line 12 connected to source, not shown. A pump 14 pressurizes the fuel, which is supplied to the engine through a metering valve unit or fuel control device 16. A constant head valve 18 is connected in the line 12 upstream from the metering orifice of valve unit 16 and in shunt with the fuel pump 14 for maintaining a fixed pressure head across the metering valve irrespective of engine speed or ambient conditions. A conduit 20 connects the constant head valve 18 to the downstream side of the metering orifice 62 of valve unit 16 to sense the pressure at this point. A cut off valve 22 is located in the fuel line between the metering orifice and the engine. Where valve 22 is in cut off position, fuel flow is diverted from the engine to the upstream side of the pump 14, thereby relieving the pump fuel pressure.

The equipment for controlling fuel to the gas turbine engine 10 comprises an electronic governor and an acceleration control mechanism. For steady-state operation of the engine, an all-speed electronic governor is utilized. With this type governor, in order to govern engine speed during steady-state conditions, it is only necessary to apply a suitable electrical signal to governor motor 24 which is drivably connected to the fuel control device 16 to control the same in a manner to be hereinafter described. The governor circuit embraces an amplifier 26 whose output is connected to the motor 24. The input to the amplifier 26 is fed from a comparing network 28, the latter of which is connected to a potentiometer 30 controlled by a throttle 32 and an engine driven alternating voltage tachometer generator 34, the frequency of which is proportional to engine speed. The frequency of the tachometer alternating voltage is measured in the engine speed counter network 36 which also includes means for producing a direct voltage which is directly proportional to engine speed. This direct voltage is fed into a lead or rate network 38 which senses engine speed, and the rate of change of engine speed. The output from this rate network is fed into the aforementioned comparing network 28. This direct voltage from the rate network is compared to a voltage reference selected by the throttle potentiometer 30, the latter voltage representing the desired engine operating speed. Throttle position is calibrated in engine r.p.m. so that each engine speed selected on the throttle picks off a voltage on the potentiometer corresponding to the speed selected. The difference between throttle reference voltage and the speed voltage from the rate network is fed into the amplifier 26, the output of which is connected to the motor 24 as hereinbefore stated to cause valve movement in an opening or closing direction depending on whether the engine is over or under the desired speed selected by the throttle.

The system is also equipped with mechanism for scheduling a given amount of fuel for instantaneous engine speeds during acceleration. This mechanism embraces a speed servo amplifier 40 having its output connected to two phase motor 42 drivably relating to a feedback potentiometer 44, and a speed selector switch 56 which is furnished with a plurality of contacts 1' to 50' each corresponding to an instantaneous engine r.p.m. The input to the speed servo amplifier 40 is supplied from the comparing network 48, the input to which is obtained from the engine speed counter network 36 and the potentiometer 44. The difference between the speed voltage from the engine speed counter network 36 and the feedback voltage from potentiometer 44 is fed into the speed servo amplifier 40. A second servo amplifier 50 is provided for modifying the position of the metering valve through a motor 52. A comparing network 54 is fed from selector switch 56, and a feedback potentiometer 58 drivably associated with the scheduling motor 52. The potentiometer is calibrated so that each angular position of the motor shaft 60 rotates the potentiometer to a corresponding position where the voltage picked off represents a given valve position at a predetermined engine speed. The output from this network 54 represents the difference between the input signals and is fed into the scheduling amplifier 50. The direction of rotation and duration of the scheduling motor persists until a nulling of the differential signal is achieved.

The metering valve unit 16 is provided with an orifice 62, the effective area of which is controlled by a valve member 64 drivably connected to the governor motor 24 through a rack and gear 66 and 68, respectively. A plurality of nozzles, not shown, are strategically located in the combustion area of the engine for spraying fuel thereinto. The constant head valve or pressure regulator 18 is equipped with a diaphragm 72, to which is connected a poppet valve 74 for controlling the pressure drop across the orifice 62 of the metering valve. The right side of the diaphragm is communicated to the downstream side of the orifice 62 via the passage 20 while the left side of the diaphragm is communicated to the upstream side of the orifice. A spring 76, interposed on the right side of the diaphragm between the latter and valve housing 78, urges the poppet valve 74 in a direction tending to close opening 80. It is a function of the poppet valve to position itself with respect to the opening 80 to maintain a constant head across the metering orifice 62. This is done by controlling by-passing of fuel back to the inlet side of the pump 14 through a connection 82. The valve member 64, which is connected to the governor motor to be positioned thereby in accordance with the steady state engine speed condition selected, is under the surveillance of a maximum fuel flow limit stop 84, during transient engine operating conditions. As will be hereinafter pointed out, the stop 84 is positionable by the fuel scheduling mechanism embracing the servo amplifiers 40 and 50 and the motor 52. A gear 86 is keyed to a shaft 88 of the motor 52 and meshes with teeth 90 of a rack 92, one end of which provides the stop 84. The rack 92 is slotted at 94 to receive a guide element 96 offset at 98 to furnish a track on which the rack rides. A minimum fuel flow adjustment stop 100 limits the fuel to a predetermined low value. A set screw 102 provides for manual adjustment of this lower limit stop. A finger 104 is integrally related to the rack 66 and depends therefrom so as to float between the stops 84 and 100 during governing.

Since fuel flow during engine transient conditions—such as would be the case where an initial engine speed is changed to some predetermined engine speed—is based on the proposition of supplying a given amount of fuel for each instantaneous engine speed, it is necessary to sense engine r.p.m. and in the instant application this is done by engine driven tachometer 34, Figure 1. The tachometer output is a sine wave whose frequency is directly proportional to engine r.p.m. The tachometer output is fed into the engine speed counter network 36 comprising an input circuit 106 connected to tube 108 which is capacitively coupled through capacitor 110 to tube 112. The two tubes have their anode circuits connected at terminal 113 to a suitable direct voltage source, not shown, and together provide an overdriven amplifier with a rectangular wave output whose frequency is proportional to engine speed. The amplified square wave output developed across the tube 112 is fed into a differentiating network comprising a capacitor 114 and resistor 116, the output of which is connected to grid 118 of gas tube 120. The gas tube is biased to cut off by a suitable direct voltage source, not shown, to be connected to terminal 122. It is a function of the differentiating network to change the square wave to peaked waves or pulses for firing the gas tube periodically in accordance with the frequency of the pulses which is a measure of the engine speed. Since the gas tube fires only when the grid sees a positive pulse, a direct voltage output is produced across the cathode resistor 124. At this point, the pulses are constant in magnitude (voltage) but are proportional to engine speed, i.e., the frequency of the pulses are proportional to engine speed. In order to obtain a direct voltage which is proportional to engine speed, the voltage developed across the resistor 124 is applied to an integrating filter circuit embracing resistor 126, inductors 128 and 130, and condensers 132 and 134. The voltage appearing across the condenser 134 to ground is a direct voltage and is proportional to engine speed.

The rate or lead network 38 embraces resistors 136 and 138 and a condenser 140. Thus, any change in input voltage to the rate network 38 will manifest itself across the resistor 138 in the form of a voltage having a combined amplitude equal to the voltage developed in proportion to engine speed plus the voltage developed as a function of the rate of change of engine speed.

This output voltage from the rate network is fed into the comparing network 28 which comprises a chopper 142 provided with an armature 144, contacts 146 and 148, and exciting coil 150, connected to a suitable alternating current source, not shown, but which may be, for example, 110 volts 400 cycle. The output voltage from the rate network is impressed on the contact 148 of the chopper and a second voltage, which represents a preselected engine operating speed created by the throttle box potentiometer 30, is impressed on the contact 146. The potentiometer 30 is supplied by a suitable direct voltage source, not shown, to be connected to terminal 152 via dropping resistors 154 and 156, the latter of which is adjustable. Throttle position corresponds to desired engine speed and establishes a reference voltage on the contact 146 which represents the speed desired. The two voltages applied to the contacts 146 and 148 as aforementioned are connected to ground through condenser 158 and resistor 160, thus completing the two circuits, which furnish signals to the comparing network 28, one circuit being completed through the potentiometer 30 and the other through the rate network 38. The governor amplifier 26 is provided with an input connection 162 on which is impressed a voltage of variable amplitude which represents the difference between the reference voltage selected by the throttle and the voltage from the rate network.

Because the comparing networks 28, 48 and 54 are alike in principle, an explanation and description of only the network 28 has been given. Also, because the governor amplifier 26, speed amplifier 40, and scheduling amplifier 50 are alike in circuitry, only one will be described in detail, this being the speed amplifier 40.

Speed amplifier 40 has a wire 164 connected to the comparing network 48, the input to which is supplied by a wire 166 connecting the engine speed counter network to one of the contacts of the chopper 167 and a wire 168 connecting the feedback potentiometer 44 to the other contact of the chopper. The signal appearing on the wire 164 is amplified in tube 170 and combined with the signal from rate generator 172 in the mixing circuit 174 embracing variable resistors 176 and 178 and condenser 180. The signal from the rate generator 172 provides a damping or stabilizing action for the network, thus introducing more accurate control. The combined signal appears on grid 182 of tube 188 which is capacitively coupled to the tube 170 by capacitor 186. This combined signal is further amplified in the capacitively coupled tubes 188 and 190, the output from which is connected to primary windings 192 of transformer 194. The anode circuits of the tubes 170, 188, and 190 are connected to a suitable direct voltage source, not shown.

The low power signal fed into the primary 192 is induced into secondary winding 196 whose opposite ends are connected to grids 198 and 200 of tubes 202 and 204, respectively. These tubes 202 and 204 control the signal output in a phase sensitive network including a push-pull amplifier 206 and a magnetic amplifier 208. The grids 199 and 201 are connected to a direct current supply, not shown, through terminal 210 and dropping resistors 212 and 214. This provides an established bias on these grids such that the signal from the secondary 196 of transformer 194 must reduce the negative signal or bias on the grid of the tube 202 at the same instant the plate voltage of that tube is positive to produce conduction in that tube. In like manner, the signal from the secondary 196 must reduce the negative signal or bias on the grid 200 of the tube 204 at the same instant the plate voltage of the latter tube is positive to produce conduction in that tube. The plate voltage for the tubes 202 and 204 comes from an alternating voltage source, not shown, having the same frequency as the voltage source utilized in actuating the choppers 28, 48, and 54, so that the signal appearing in the secondary winding 196 will be of the same frequency as that applied to the plates of the aforementioned tubes, and either in phase or 180° out of phase with the anode signal. If the voltage applied to the plate of tube 202 is of such a phase as to make the plate positive at a time when the grid voltage of that tube is going positive due to an engine over-speed condition (the feedback potentiometer signal not having caught up with the engine speed signal impressed on wire 166), the tube will conduct an average direct current through control winding 216 of the magnetic amplifier 208. On the other hand, if the plate voltage on the tube 204 is going positive due to an underspeed condition (the feedback potentiometer signal now exceeds the signal impressed on wire 166), the tube 204 will conduct an average direct current through control winding 218 of the magnetic amplifier 208. In addition to the control windings 216 and 218, the magnetic amplifier comprises two cores 220 and 222, primary windings 224 and 226 connected to a suitable alternating voltage supply of the proper frequency, and secondary windings 228 and 230. The secondary windings are connected in series bucking with variable phase winding 232 of the two phase motor 42. The motor 42 is also equipped with a fixed phase winding 234 connected to the same source of alternating current supply, not shown, to which the plates of tubes 202 and 204 are connected. A condenser 236 interposed between the winding 234 and the alternating source, not shown, establishes a 90° phase relationship between the motor windings 232 and 234. With no direct current or equal currents in the control windings 216 and 218, the supply voltage is divided equally across the primary windings 222 and 224 and the secondary voltages which are equal and opposite at this time cancel each other. Under these conditions, no voltage appears across the variable phase winding 232. If, for example, the engine speed signal impressed on the wire 166 of the chopper 48 were greater than the signal from the feedback potentiometer 44 on wire 168, the control winding 216 will conduct an average direct current which will saturate the core 220. Since the voltage across the primary windings is divided between them in direct proportion to their impedances, the voltage developed across the secondary winding 230 will be of greater magnitude than the voltage across the secondary winding 228, with the voltage difference between these two windings being applied to the variable phase winding 232 of the motor 42, causing rotation in a predetermined direction. Should the voltage from the feedback potentiometer 44 be greater in magnitude than the engine speed signal, control winding 218 will saturate, thus producing an output voltage 180° out of phase with the previously developed voltage as a result of saturating the winding 216. This phase shift will, of course, be transmitted to the variable phase winding 232, causing a reversal of the motor 42.

In order to stabilize the speed amplifier network, the rate generator 172 is connected into the circuit 174 as aforementioned. Field winding 238 of the rate generator is excited from the same alternating voltage source which supplies the excitation to the primary windings 224 and 226. The generator output voltage is directly proportional to the driving motor speed. The phase relationship of the generator output voltage to the excitation voltage is a function of the direction of motor rotation. The generator output voltage is either in phase or out of phase with the excitation voltage.

The comparing network 54 is identical in principle of operation to the networks 28 and 48. Wires 240 and 242 furnish the comparing network 54 with signals from the potentiometers 1″ to 50″ and the feedback potentiometer 58, respectively.

With reference to Figure 1, the selector switch 56 is provided with fifty contacts, numbered 1′ to 50′ on the drawings, arranged to be wiped by an arm 246 which is rotated by the motor 42. These contacts represent instantaneous engine speeds. The switch 56 may be constructed with any number of contacts, depending on the increments into which it is desired to divide the speed range of the engine. It has been found that for exploring the engine characteristics of the average engine, a division of fifty contacts is adequate. Thus, if the engine had a speed range from zero to 10,000 r.p.m., there would be a contact for every 200 engine r.p.m. Potentiometers 1″ to 50″ are associated with the contacts 1′ to 50′, respectively, and are adjustable from zero to maximum value of fuel flow for every 200 r.p.m. of engine speed. The potentiometers 1″ to 50″ are independently adjustable for positioning the movable stop 84 to establish a particular valve setting for supplying a predetermined amount of fuel to the engine at some instantaneous engine speed. The potentiometers 1″ to 50″ are graduated in weight of fuel/hr. so that any desired fuel requirement can be readily selected manually. Where the wiper arm bridges two contacts, an average of the two respective contact settings is obtained; therefore, the 50 contacts provide 99 increments.

Figure 3:
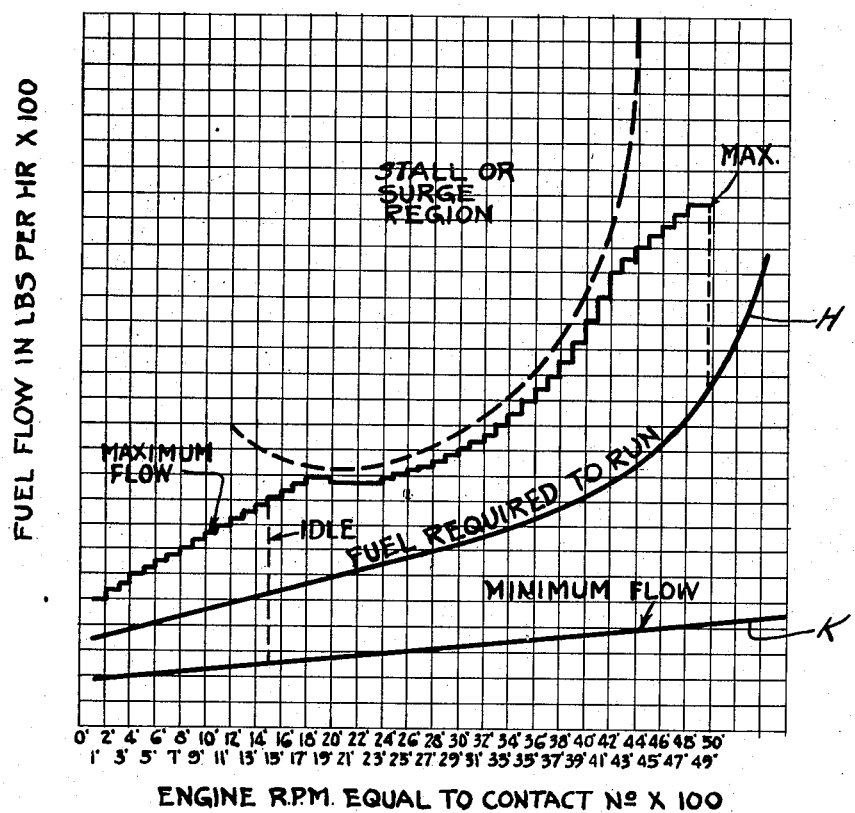
Figure 3 represents a typical fuel flow versus r.p.m. curve for an engine of the gas turbine variety wherein the invention is employed.

Figure 3 shows characteristic fuel flow curves for a gas turbine engine wherein curve H represents a steady state engine fuel flow requirement, curve K represents a minimum fuel flow requirement, and curve M represents acceleration fuel flow requirements. The abscissa is plotted in speed increments of 200 r.p.m. based on an engine having a maximum speed of 10,000 r.p.m. The ordinate depicts weight of fuel flow required for a given instantaneous engine speed.

An engine temperature sensing unit 275 is associated with the engine for checking engine temperatures during trial runs if this becomes necessary or desirable. Engine temperatures are usually limited to a maximum value and this device will indicate instantaneous engine temperatures for predetermined fuel flow and engine speeds. The device forms no part of the invention.

Operation and function of the invention is as follows:

Assume that an engine whose operating characteristics are unknown is to be tested with a view to determining its optimum fuel requirements. Assume also that the engine is to run at an idling speed of 3,000 r.p.m. Since each contact of the selector switch represents 200 engine r.p.m. increments, the wiper arm 246 will move over contacts 1′ to 15′ before coming to rest on contact 15′ where engine speed will have reached the selected speed (3,000 r.p.m.). Also, for maximum acceleration performance, it is necessary to feed the exact amount of fuel at each instantaneous value of engine speed. Therefore, before starting the engine, each of the potentiometers from 1″ to 15″ must be manipulated to set up a signal which represents a predetermined amount of fuel which it is believed the engine ought to have for that instantaneous speed corresponding to the contact of the associated potentiometer. The engine throttle 32 is now set at that position which will cause the potentiometer 30 to develop a signal corresponding to 3,000 r.p.m. The electrical system is readied for operation and the engine is now started by any suitable means, not shown. With the throttle in this position, a signal will be impressed on the comparing network which is fed into the governor amplifier in such a direction as to tend to cause the motor 24 to move valve member 64 toward open position. This moves the finger 104 against the movable stop 84. That is, so far as the governor is concerned, it is ready to open the valve to a maximum and dump in all the fuel available for a rapid acceleration of the engine. Obviously, the scheduling motor will not permit this. As soon as the engine starts turning over, the engine driven tachometer 34 produces a signal which is fed into the comparing network 28 where the tachometer signal is compared to the signal picked off by the potentiometer 30. As the engine speed increases and the wiper arm moves over the contacts 1′ to 15′, the potentiometers 1″ to 15″, respectively, come into operation to cause the movable stop 84 to assume whatever position is dictated by the potentiometer selection for a particular instantaneous engine speed. When the signal from the tachometer approaches the signal from the throttle potentiometer 30, the output signal from the comparing network 28 will be nulled and the governor motor will dynamically govern about the preselected 3,000 r.p.m.

The first servo amplifier 40 which drives motor 42 functioned as follows during the increase in engine speed up to 3,000 r.p.m.: As the engine increased its speed and rotated the wiper arm 246 over the contacts, the feedback potentiometer 44 which is connected to the motor shaft is also rotated to a position to pick off a voltage corresponding to the angular travel of the shaft. This voltage is fed into the comparing network 48 where it is compared with the engine speed signal from the tachometer. If these signals are equal, the wiper arm would come to rest on that contact. If the tachometer signal is greater, the motor 42 continues to rotate the wiper arm 246 until the signal from the potentiometer 44 equals the tachometer signal.

The second servo amplifier, which controls the scheduling motor during an increase in engine speed up to 3,000 r.p.m., functions as follows: As the wiper arm 246 selects the different contacts 1′ to 15′, the fuel potentiometers 1″ to 15″ come into action. The signal from the fuel potentiometer selected is compared in the network 54 to the signal from the feedback potentiometer 58 and the error fed into the scheduling motor 52.

If it should be desired now to explore the engine operation between 3,000 r.p.m. and 8,000 r.p.m., the potentiometers 16″ to 40″ will be adjusted in advance of the new throttle setting to whatever values are believed necessary to obtain the desired engine performance during the acceleration period. The engine throttle 32 is now moved to a position corresponding to 8,000 r.p.m. of the engine. The mechanism will now automatically schedule fuel at the rate determined by the advance setting of the fuel potentiometers 16″ to 40″ until the throttle speed setting is reached.

If, during, or even after, the trial run it is determined that engine temperature is too high in certain areas or that surge is likely to be encountered (see Figure 3) at certain temperatures and engine speeds, those areas can always be rechecked. As soon as the signals fed into the network 28 become nulled, the governor motor will again dynamically govern about the 8,000 r.p.m. which was preselected.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. Equipment for determining optimum fuel flow requirements of a gas turbine engine, said equipment comprising a fuel flow control device, means operatively connected to said device for preselecting a desired engine speed, and means connected to said device and controlled by engine speed for scheduling fuel during transient conditions, said last named means including a plurality of mechanisms, each operated during a separate predetermined increment of engine speed and each mechanism being provided with apparatus capable of independent control of said device during the mechanism's increment of engine speed.

2. Equipment for determining optimum fuel flow requirements of a gas turbine engine, said equipment comprising a fuel flow control device, means operatively connected to said device for establishing the engine at a predetermined speed, and means connected to said device for scheduling fuel during transient conditions in accordance with engine speed up to said predetermined speed and including a mechanism provided with apparatus capable of establishing a plurality of limits on fuel flow, each corresponding to a given increment of engine speed, and each limit being adjustable independently of the other limits.

3. Equipment for determining optimum fuel flow requirements of a gas turbine engine having a fuel control device therefor, said equipment comprising first means operatively related to said device for controlling engine operation, second means operatively related to said device for supplying a given amount of fuel to said engine for any engine speed, said second means including a plurality of speed sensitive mechanisms each of which is operative over a preselected increment of speed, and adjustable third means for each of said mechanisms for predetermining the fuel flow at that speed.

4. A mechanism for controlling fuel to a gas turbine engine comprising an electronic engine governor embracing means for selecting a speed at which the engine is to operate, an electronic servo amplifier having an input proportional to engine speed and embracing a motor whose shaft angular position corresponds to instantaneous values of engine speed, a second electronic servo amplifier having means controlled by the motor shaft for creating an input to said second amplifier which represents a given amount of fuel for a given angular position of the shaft, and a fuel control device connected to said governor and the output of said second amplifier.

5. A mechanism for controlling fuel to a gas turbine engine comprising means for establishing a predetermined engine speed, a first electronic servo amplifier having an input circuit on which is impressed a signal proportional to engine speed and embracing a selector switch having a plurality of positions corresponding to instantaneous values of engine speed, a second electronic servo amplifier provided with means associated with each position of said switch for developing an input signal to said second amplifier which represents a given amount of fuel for the engine speed corresponding to the position of said switch, and a fuel control device embraced in said first named means and operatively related to the output of said second amplifier.

6. In a fuel control mechanism for a gas turbine engine, means for establishing a fuel flow which will operate the engine at a preselected speed above an initial speed, said means including a first electronic servo amplifier having its output connected to an electrically controlled actuator, a selector switch having a plurality of contacts, said actuator being connected to said switch to cause the same to assume a position on the different contacts each of which correspond to instantaneous values of engine speed, said amplifier having an input circuit on which a signal proportional to engine speed is impressed, a potentiometer connected to said actuator to be moved thereby simultaneously with said switch to pick off a voltage corresponding to the instantaneous engine speed, a connection from the potentiometer to said amplifier input, a second electronic servo amplifier, a potentiometer connected to each of the contacts and associated with the second amplifier to provide an input thereto which represents a prescribed amount of fuel flow at the instantaneous engine speed corresponding to the contact engaged by the selector switch, and a fuel control device connected in the output of said second amplifier.

7. In a fuel control mechanism for a gas turbine engine, means for establishing a fuel flow which will operate the engine at a preselected speed beyond a given speed, said means including a first electronic servo amplifier having its output connected to a motor driven selector switch having a plurality of contacts each corresponding to instantaneous values of engine speed, said amplifier having an input circuit on which a signal proportional to engine speed is impressed, a potentiometer connected so as to be moved with said selector switch to pick off a voltage corresponding to the position of said switch, a connection from the potentiometer to said amplifier input, a second electronic servo amplifier, a potentiometer connected to each of the contacts and associated with the second amplifier to provide an input thereto which represents a prescribed amount of fuel flow at an instantaneous engine speed corresponding to the contact engaged by said selector switch, each of said last mentioned potentiometers being manually settable in advance of said engine speed attaining the preselected instantaneous speed, and a fuel control device connected in the output of said second amplifier.

8. A mechanism for controlling fuel to a gas turbine engine provided with a metering device having an orifice across which a constant pressure head is applied, said mechanism comprising an electronic governor which embraces a manually controlled device for preselecting a desired engine operation, means controlled by the governor and associated with said orifice for varying the effective area thereof, and an electronic control mechanism responsive to engine speed and operatively connected to said means, said last mentioned mechanism being provided with apparatus capable of automatically selecting prescribed amounts of fuel at predetermined instantaneous engine speeds during transient engine operation.

9. In a fuel control for a gas turbine engine comprising a fuel valve having a flow passage, a member positionable for controlling flow in said passage, an electronic governor operatively connected to the member, and electronic scheduling apparatus operatively connected to said member and controlled by engine speed for providing a respective preselected fuel flow controlling position for said member for each of a plurality of preselected engine speeds indpendently of the operation of said governor, and means for adjusting each of said preselected fuel flow controlling positions independently of the other positions.

10. Equipment for determining optimum fuel flow requirements of a gas turbine engine, said equipment comprising a fuel control device, means operatively connected to said device for preselecting a desired value of engine speed, and means connected to said device and controlled by a variable condition of the engine for scheduling fuel during transient conditions, said last named means including a mechanism having a plurality of positions, each operated during a separate predetermined value of said variable condition and each position being provided with apparatus capable of independent control of said device during its respective predetermined value of said variable condition.

11. Equipment for determining optimum fuel flow requirements of a gas turbine engine, said equipment comprising a fuel control device, electrical means operatively connected to said device for establishing a voltage for maintaining the engine at a predetermined speed, and electrical means connected to said device for scheduling fuel during transient conditions in accordance with engine speed up to said predetermined speed and including an electrical circuit provided with a plurality of independently adjustable means for selecting electrical values corresponding to desired fuel flow at each of a plurality of increments of speed.

12. A mechanism for controlling fuel to a gas turbine engine comprising a fuel valve, a first circuit including means for establishing a signal proportional to a requested engine speed, means establishing a signal proportional to actual engine speed, means comparing said speed request and actual speed signals to produce a speed error signal, a first amplifier for amplifying said speed error signal, and motor means driven by said amplifier for controlling the position of said fuel valve; and a second circuit including a selector switch having a plurality of positions corresponding to increments of engine speed, means for comparing the output of said selector switch with said actual speed signal to produce a second speed error signal, a second amplifier for amplifying said second error signal, and means operatively connecting the output of said second amplifier to said valve in such manner as to limit the flow established by said first circuit over the acceleration range of the engine.

13. A fuel control for an engine comprising a fuel conduit for delivering fuel to said engine, a fuel flow control device in said conduit, an all-speed governor for controlling fuel flow through said device, and means for limiting fuel flow to said engine during transient conditions following resetting of said governor to a desired speed including apparatus operably connected to said device capable of establishing a plurality of limits on fuel flow, each corresponding to a given increment of engine speed and each flow limit being adjustable independently of the other limits.

References Cited in the file of this patent
UNITED STATES PATENTS

| | | |
|---|---|---|
| 2,384,340 | Reggio | Sept. 4, 1945 |
| 2,557,526 | Bobier | June 19, 1951 |
| 2,592,385 | Borden et al. | Apr. 8, 1952 |
| 2,662,372 | Offner | Dec. 15, 1953 |
| 2,720,751 | Kunz | Oct. 18, 1955 |